United States Patent [19]

Fujiwara

[11] Patent Number: 5,070,476
[45] Date of Patent: Dec. 3, 1991

[54] SEQUENCE CONTROLLER

[75] Inventor: Katsuhiro Fujiwara, Sakurashi, Japan

[73] Assignee: Hitachi, Ltd., Tokyo, Japan

[21] Appl. No.: 178,198

[22] Filed: Apr. 6, 1988

[30] Foreign Application Priority Data

Apr. 7, 1987 [JP] Japan .................................. 62-83802

[51] Int. Cl.⁵ .......................................... G06F 15/46
[52] U.S. Cl. .................................. 395/575; 364/136; 364/140
[58] Field of Search ............... 364/200, 900, 140, 136, 364/518

[56] References Cited

U.S. PATENT DOCUMENTS

| | | | |
|---|---|---|---|
| 4,253,141 | 2/1981 | Suzuki et al. | 364/104 |
| 4,415,965 | 11/1983 | Imazeki et al. | 364/136 |
| 4,425,630 | 1/1984 | Yomogida et al. | 364/900 |
| 4,432,047 | 2/1984 | Okayama | 364/147 |
| 4,502,112 | 2/1985 | Fujiwara et al. | 364/200 |
| 4,530,063 | 7/1985 | Masuda et al. | 364/518 |
| 4,550,366 | 10/1985 | Toyama et al. | 364/136 |
| 4,683,549 | 7/1987 | Takaki | 364/900 |
| 4,733,343 | 3/1988 | Yoneda et al. | 364/184 |
| 4,748,553 | 5/1988 | Itoh et al. | 364/140 |
| 4,807,178 | 2/1989 | Fujiwara et al. | 364/900 |
| 4,833,589 | 5/1989 | Oshiga et al. | 364/140 |
| 4,908,745 | 3/1990 | Ichiyasu et al. | 364/140 |

FOREIGN PATENT DOCUMENTS 60-57403 4/1985 Japan .
60-217402 10/1985 Japan .
61-40605 2/1986 Japan .

Primary Examiner—Gareth D. Shaw
Assistant Examiner—Maria Napiorkowski
Attorney, Agent, or Firm—Antonelli, Terry, Stout & Kraus

[57] ABSTRACT

In a sequence controller which is capable of debugging a program including a plurality of sequence programs, a program head code is provided in the program to identify respective sequence programs. In executing the program, the number of sequence programs which are executed is counted by detecting the program head codes associated therewith. Thus, sequence processing can be effected for a predetermined number of sequence programs by stopping the processing of the sequence when the count of the detected program head codes becomes equal to the predetermined number. In addition, it is possible to count only those sequence programs which satisfy a certain condition, such as sequence programs which require a particular operation or relate to a particular control element. In this way, debugging of the program is facilitated.

38 Claims, 12 Drawing Sheets

FIG. 4
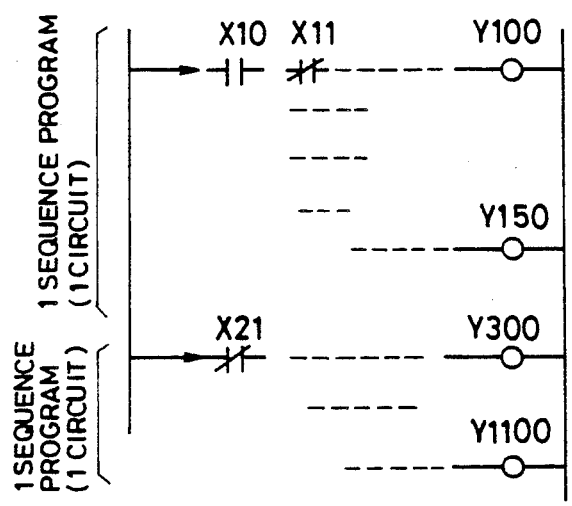
FIG. 5
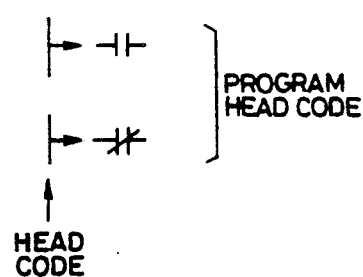
FIG. 6

SEQUENCE CONTROLLER

BACKGROUND OF THE INVENTION

The present invention relates to a sequence controller, and particularly to a sequence controller which is capable of debugging programs.

In conventional sequence controllers, the program debugging functions include:

(1) a function of holding the input/output status of the sequence controller inputs and outputs when the operation thereof is stopped;

(2) a function of stopping the operation after one step (command) is executed; and (3) a function of stopping the operation after one scan is executed, as disclosed in Japanese Patent Laid-Open No. 40605/1986, Japanese Patent Laid-Open No. 57403/1985 and Japanese Patent Laid-Open No. 217402/1985.

According to Japanese Patent Laid-Open No. 40605/1986, which deals with an ordinary sequence controller, when the controller is shifted from the operation state to the stop state, all of the outputs that are to be turned off are maintained under the status which exists just before the operation is stopped. Therefore, the status of inputs and outputs which exists when the sequence controller is stopped can be determined even after the operation of the sequence controller has been stopped, making it possible to resume the operation starting from the status existing just before the operation is not stopped. With this function, however, it is allowed to stop the sequence controller at a particular portion of the sequence program, nor to determine the status of inputs and outputs at that moment.

According to the function disclosed in Japanese Patent Laid-Open No. 57403/1985, the sequence controller is stopped after every step of the sequence program. This function may make it possible to determine the step of command execution minutely from any program step. Generally, however, the user of the sequence controller may examine the control operation of a sequential circuit but may not give consideration to the order in which the contents of the sequence controller are executed or to the individual steps of the program being executed by the sequential circuit. In this sense, therefore, this prior art is cumbersome to use since the user is compelled to understand the contents of the sequence controller before using it.

According to Japanese Patent Laid-Open No. 217402/1985, the sequence controller is stopped at the end of one scanning which represents a break in the processing of the command "Execute again from the head when the execution of contents of all program memories is finished", which is a so-called cyclic scanning process that is a feature of the operation of the sequence controller in contrast with Japanese Patent Laid-Open No. 57403/1985. By examining the statuses of objects to be controlled, it is possible to recognize the status for executing a program and to carry out the debugging operation. Unlike Japanese Patent Laid-Open No. 57403/1985, furthermore, no particular knowledge is required for the sequence controller. In case the same object to be controlled undergoes a change two or more times in one scanning, however, it becomes difficult to determine the status so that it is not possible to carry out a complete debugging operation.

Moreover, the aforementioned three prior examples can cope only with the setting of a simple stop condition, but are not sufficient for recognizing the status of inputs and outputs after complex conditions which are inherent in the program debugging operation.

Problems in the aforementioned prior art are that the status of a control operation performed by the sequence controller is not recognized with a sufficient precision and that the method for designating the debugging functions that are to be is complex.

SUMMARY OF THE INVENTION

The object of the present invention is to provide a sequence controller in which a debugging operation is facilitated and which is capable of sufficiently recognizing the status of inputs and outputs of the controller under complex stop conditions.

The present invention comprises means for detecting the location of a break of boundary of a sequence program corresponding to a unit of a sequential circuit, means for counting the number of sequence programs which have been executed, and means which stops the sequence processing when the number of the counted sequence programs reaches a predetermined number, so that debugging of the sequence processing may be effected after a predetermined number of sequence programs have been executed.

According to the present invention, the sequence processing can be effected for any number of sequence programs in the program to facilitate the debugging operation.

BRIEF DESCRIPTION OF THE DRAWINGS

FIG. 4 is a diagram which illustrates a sequential circuit;

FIG. 5 is a diagram which illustrates a program head code;

FIG. 6 is a diagram illustrating a program which corresponds to the circuit of FIG. 4;

DESCRIPTION OF THE PREFERRED EMBODIMENTS

Figure 1:
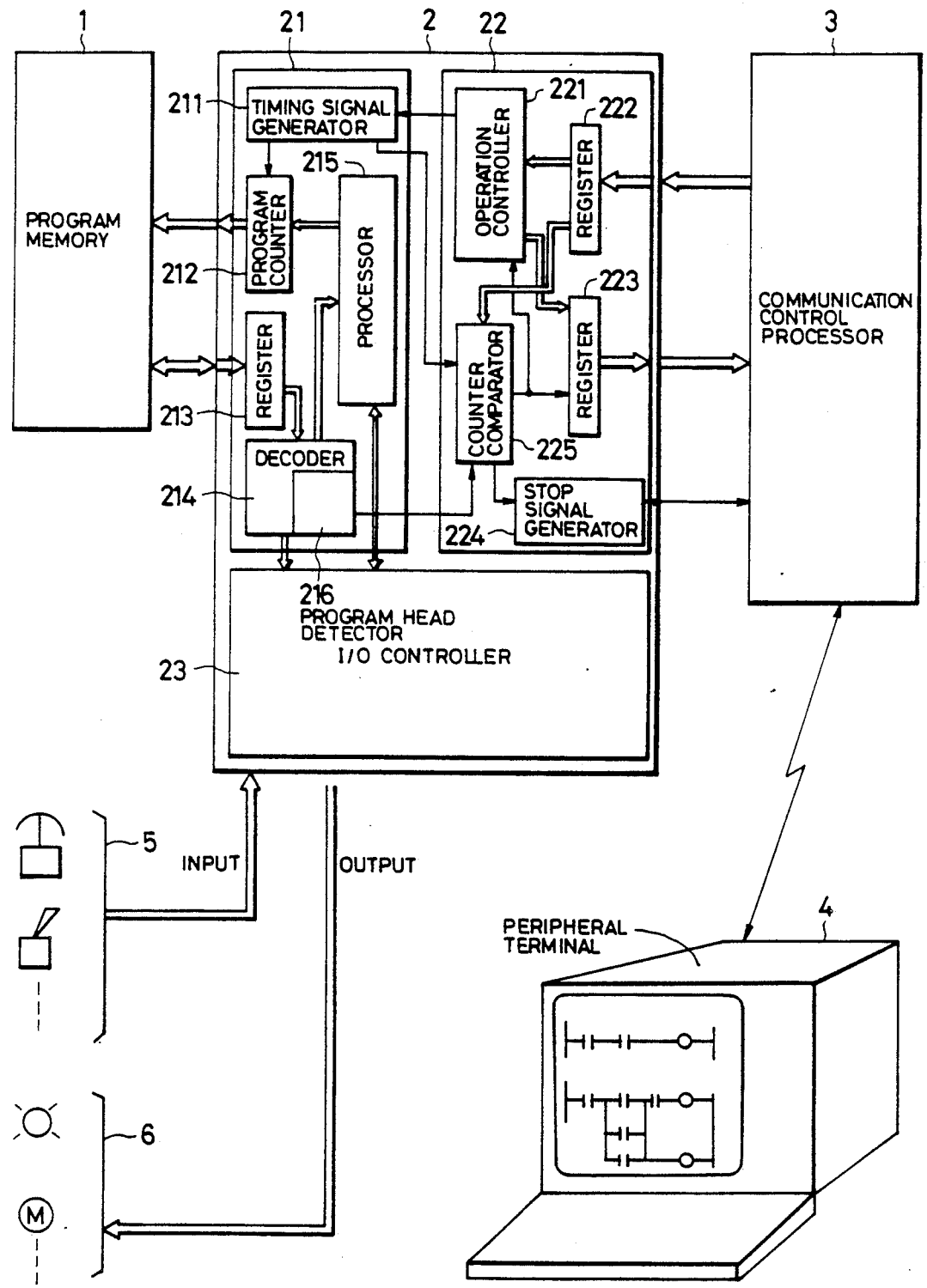
FIG. 1 is a diagram illustrating the structure of a system according to a first embodiment of the present invention.

FIG. 1 is a diagram of a sequence controller for stopping the processing after the processing of n circuits according to a first embodiment of the present invention. The structure of the embodiment will now be described.

A program memory 1 stores a sequence program which consists of a plurality of sequence program segments (hereinafter referred to as simply as "sequence programs"). FIG. 6 illustrates the contents of the program memory 1. A sequential circuit in this case is as shown in FIG. 4. The sequential circuit will hereinafter be considered as divided into sequential circuit units, and the sequence programs are stored in the program memory 1 indicating a head code as a break of or boundary sequence program for each of the sequential circuit units. When the head code is found, it means that the reading of the sequence program for a particular sequential circuit unit is finished and the procedure is renewed to read the sequence program for the next sequential circuit unit.

The sequence processing unit 2 reads the sequence programs successively from the sequence program memory 1, effects the required sequence processing depending upon the input conditions of a sequence control input 5, and sends the results of the sequence processing as a control output 6 to the control system. The sequence processing unit 2 further checks to determine whether or not a code that is read out is a head code of a sequence program, and stops reading from the program when a stop sequential circuit number n is reached. Thus, the sequence processing is stopped.

A communication control processor 3 is interposed between the sequence processing unit 2 and peripheral equipment 4 to communicate a variety of data therebetween.

The sequence processing unit 2 consists of a plurality of constituent elements as shown in FIG. 1. These constituent elements will be described in the following description of the operation of the sequence controller.

The sequence processing unit 2 successively reads the sequence programs from the program memory 1, carries out the operation called for by the sequence program based upon the status of input 5 (sequence control input) from the object that is to be controlled, and produces an output 6 (sequence control output) to the object that is to be controlled.

In many cases, furthermore, equipment for monitoring and programming, such as peripheral equipment 4, is connected to the sequence processing unit 2. In addition to the sequence processing unit 2, furthermore, a communication control processor 3 may be provided to carry out communication control for the peripheral equipment 4 independently of the sequence operation.

If viewed in further detail, the sequence processing unit 2 is comprised of a command processor 21 which chiefly effects control over accesses to the memory 1, an input/output controller 23 which controls the input/output operations for the control input 5 and control output 6, and an operation controller 22 which chiefly effects the processing associated with the communication processor 3.

If mentioned in further detail, the processor 21 has a timing signal generator 211 which produces timing signals so that each of the units operate with a required timing. First, a program counter 212 sends a program address to the memory 1 whereby program data is read from a storage location that corresponds to the received address. The program data is first stored in a command register 213 and next is supplied to a command decoder 214 which, upon interpretation of a command, sends a corresponding control signal to the input/output controller 23 and to the command processor 215. The command processor 215 performs an operation based upon data received from the input/output controller 23, and returns the result back to the input/output controller 23, whereby the sequence control operation is realized.

Upon receipt of a sequence run/stop command from the processor 3, i.e., from the peripheral equipment 4, the operation controller 22 transmits the command to the timing signal generator 211 to cause the sequence controller to stop or run, and further indicates to the processor 3 when the sequence controller is stopped.

The former operation is realized when predetermined data is written by the processor 3 into the sequence control register 222, is sent to the run/stop controller 221, and is finally transmitted to the timing signal generator 211.

The latter operation is realized by informing the processor 3 of the stopping of the sequence controller as quickly as possible from a sequence controller stop signal generator 224 and by indicating the cause of the stopping from a sequence controller status register 223.

The units which are provided according to the present invention include a program head detector 216 that serves as a code determining means provided as an extension of the command decoder 214, a head code counter 225 that serves as a counting means to count the inputs from the program head detector 216, and the run/stop controller 221 that serves as a control means which stops the sequence processing when the counted value of the head code counter 225 becomes equal to or greater than the number of circuits input through the peripheral equipment 4.

Figure 2:
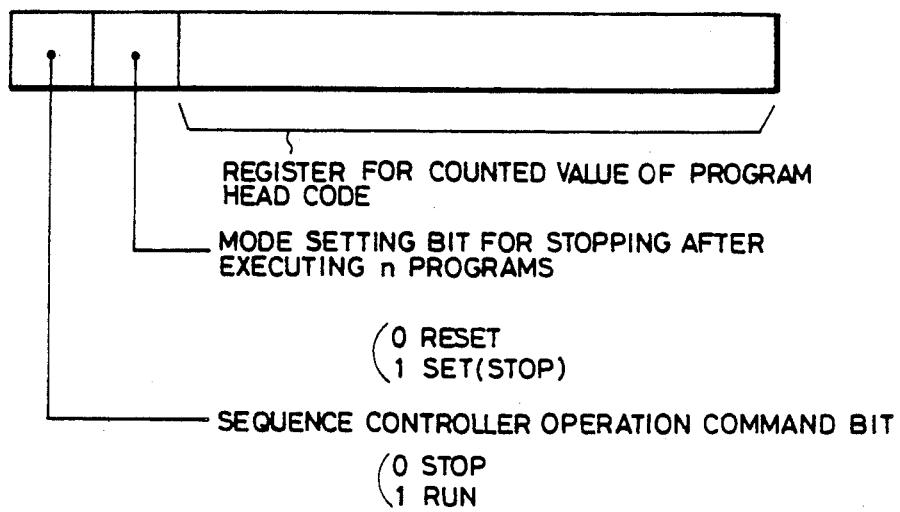
FIG. 2 is a diagram illustrating the data structure of a control register.
Figure 3:
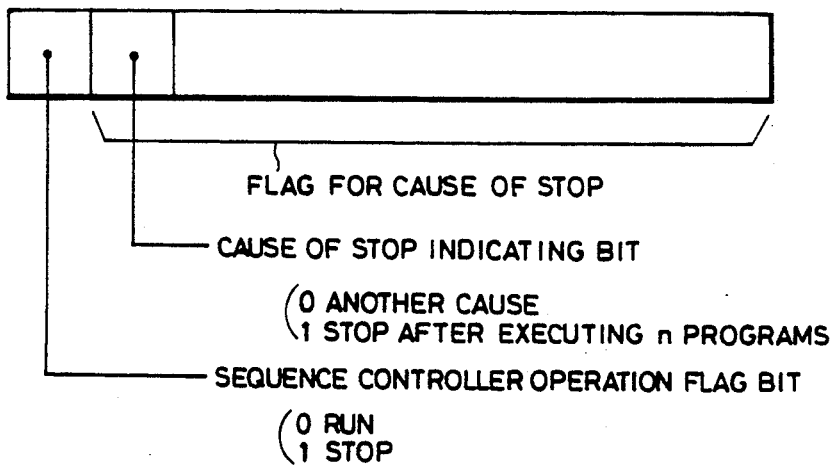
FIG. 3 is a diagram illustrating the data structure of a status register.

FIGS. 2 and 3 illustrate bit structures of a sequence control register 222 and a sequence controller status register 223, respectively.

In FIG. 2, the control register 222 consists of a sequence controller operation command bit ("1" stands for run and "0" stands for stop), a mode setting bit for stopping operation after executing n programs ("1" stands for stop and "0" stands for run), a register for storing a counted value of program head codes.

In FIG. 3, the status register 223 consists of a sequence controller operation flag bit ("1" stands for stop and "0" stands for run), a cause of stop indicating bit ("1" stands for a stop after executing n programs, and "0" stands for another cause), and a flag for cause of stop.

FIG. 4 illustrates a sequential circuit, FIG. 6 illustrates a program representing the circuit of FIG. 4 as stored in a sequence program memory, and FIG. 5 illustrates a program head code according to the present invention. This code is placed only at the head of a sequence program but is not placed in the program in the example of FIG. 6.

That is, FIG. 4 illustrates a sequential circuit which consists of a set of sequential circuit units. FIG. 6 illustrates an example where the sequential circuit is represented by a series of sequence programs stored in the memory 1. The program head code is provided as shown in FIG. 5 for each of the sequence programs corresponding to sequential circuit units and is buried in the head address of each of the sequence programs in the memory 1.

Figure 7:
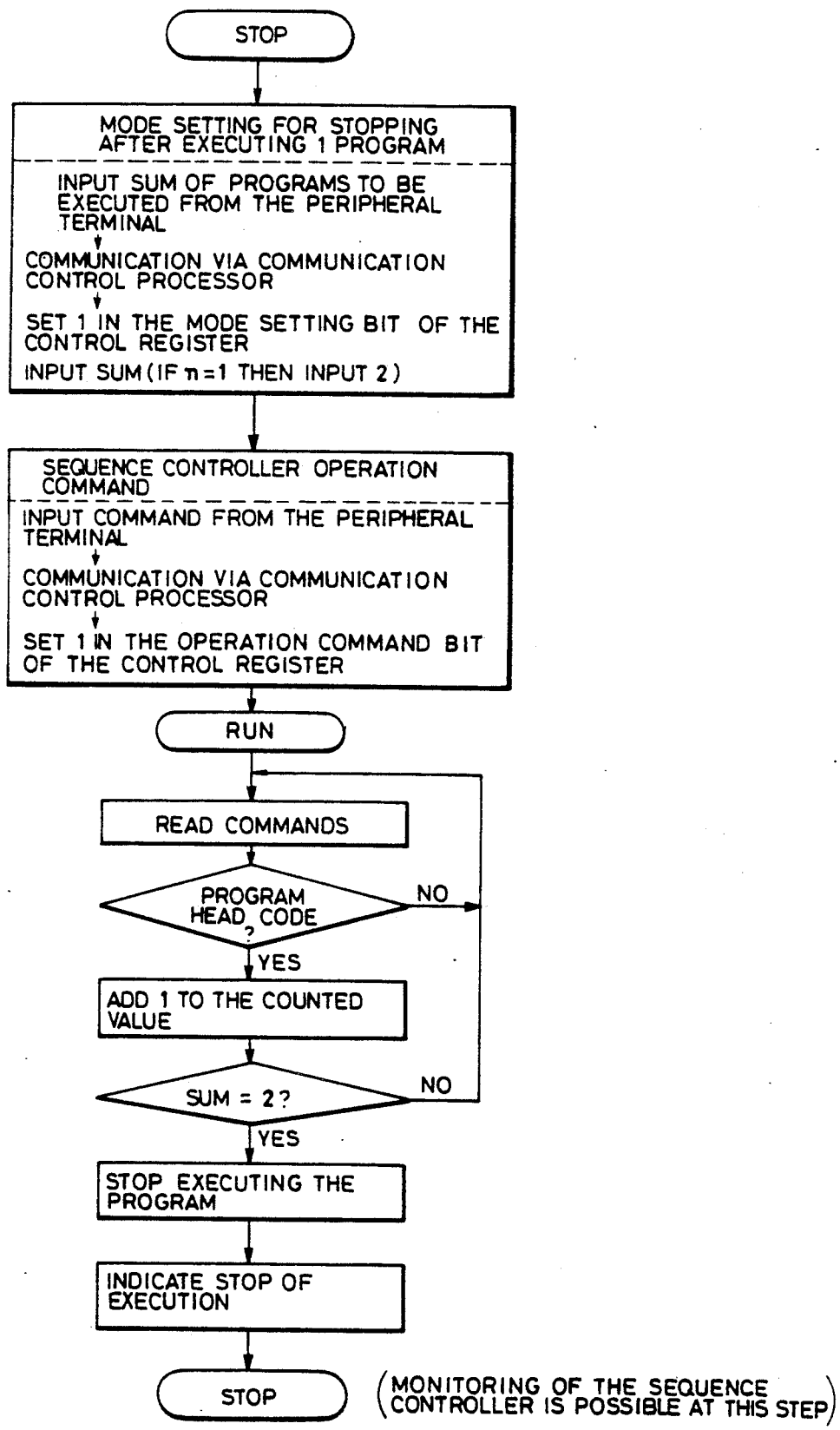
FIG. 7 is a diagram of process flow according to the first embodiment of the present invention.
Figure 8:
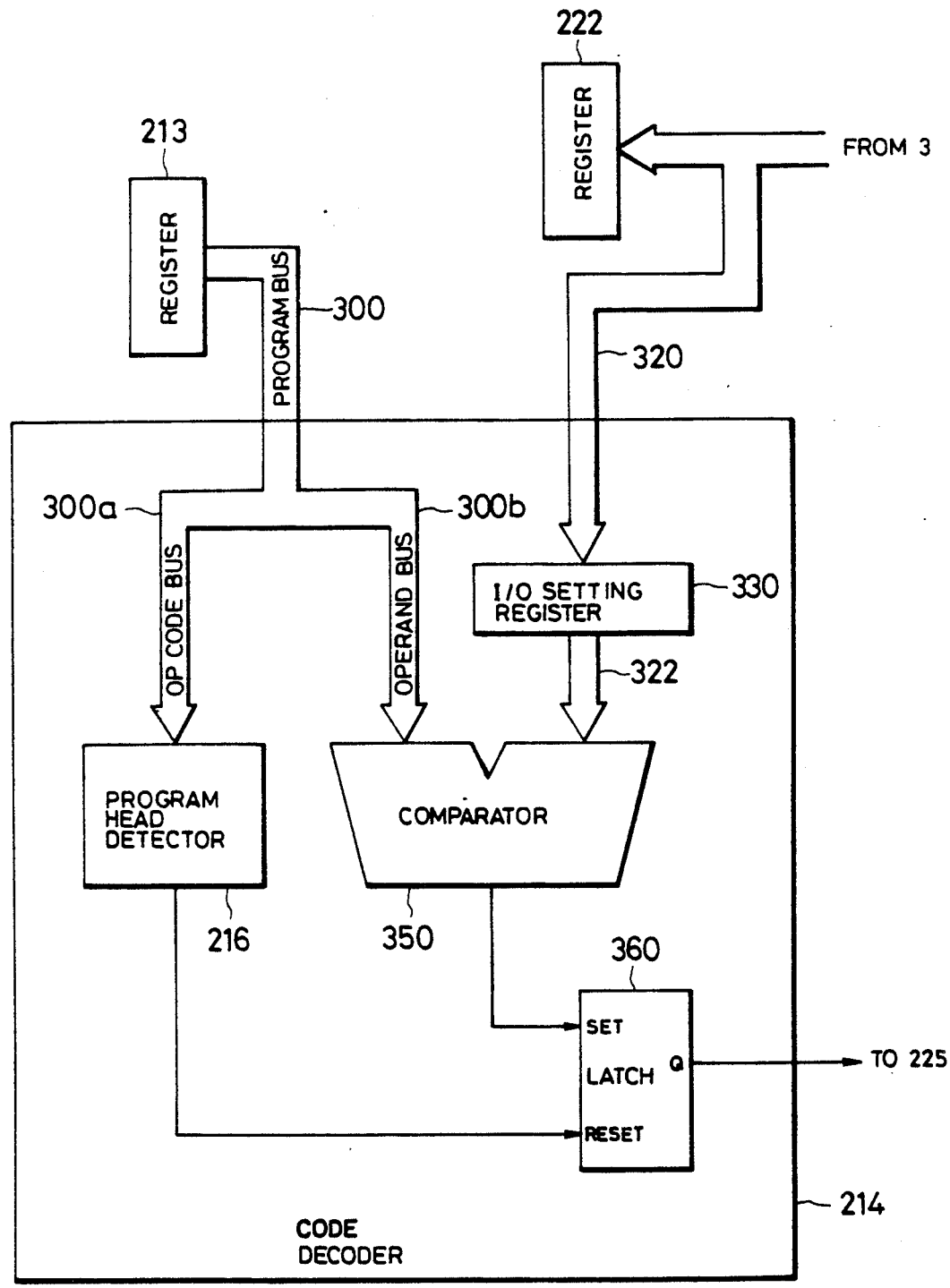
FIGS. 8, 9, 10 and 11 are a block diagram illustrating the structure of major portions of a sequence controller according to a second embodiment of the present invention, a flow chart illustrating the operation thereof, a diagram illustrating a sequential circuit that is to be processed, and a time chart of outputs.
Figure 9:
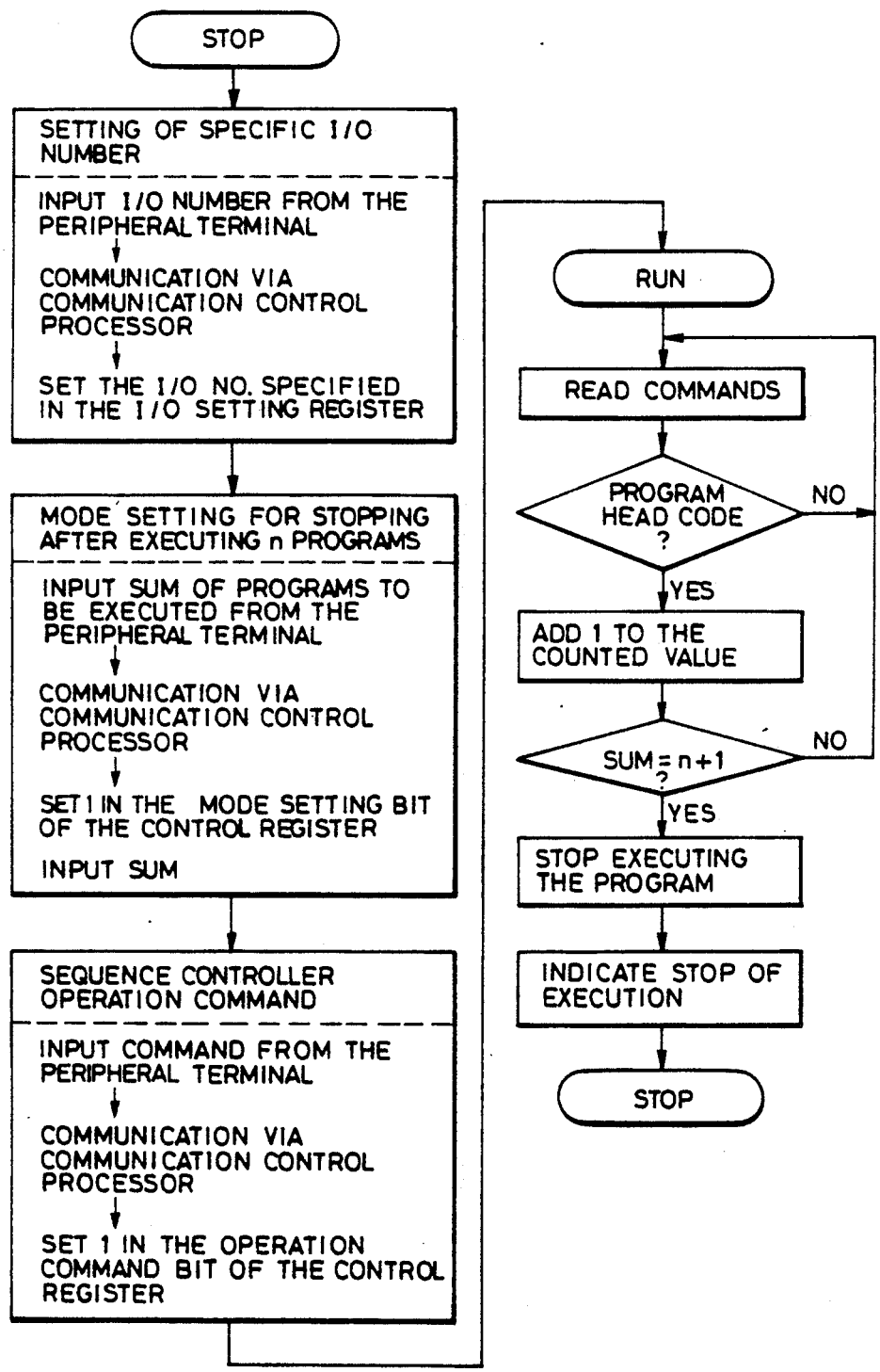

Next, the operation for stopping the sequence controller after the execution of n sequence programs, which is an object of the present invention, will be described in conjunction with FIG. 7 with reference to the case where n=1.

First, when the sequence controller is at rest, the number n of sequence programs to be processed is input from the peripheral equipment 4. In this case, the value n is 1 by way of example. The value n input through the peripheral equipment 4 is transmitted to the control register 222 via the communication control processor 3 and is stored in a program head count number register in the control register 222. Next, 1 is input as the mode setting bit to indicate stopping of the sequence after executing n programs and is stored in the control register 222 to set the mode for stopping the sequence after executing n sequence programs. Then, 1 is input as the sequence controller operation command bit in the control register 222 to run the sequence controller. The sequence controller executes the commands successively. In this case, 1 is added to the counter 225 every time a program head code is detected. When the count 2 is obtained, i.e., when the second program head has been detected after the first program head or, in other words, when one sequence program is executed, a signal is sent to the controller 221 as an internal stop command and is further sent as an external stop information signal from the generator 224 to the processor 3, and the operation of the sequence controller comes to a halt. At this moment, the sequence controller will hold the status to its inputs and outputs. Therefore, if this status is monitored using the peripheral equipment 4 at a subsequent time, the status of inputs and outputs after the execution of one sequence program can be determined.

According to this embodiment, the prior art is modified to a relatively small degree to realize the function contemplated by the present invention. As for the designation, furthermore, the user designates the circuit units that can be fully comprehended by him.

According to this embodiment, the debugging function can be designated for each of the sequence programs that represent minimum units of a circuit, making it possible to reduce the debugging time to:

about 1/10 compared with where there exists no debugging function at all;

about 1/10 compared with where there exists a function that holds the status existing when the operation is stopped;

about ½ compared with when there is a function for stopping after executing one step; and about ½ compared with when there is a function for stopping after executing one scanning.

To stop the sequence processing after the execution of a given number of sequence programs, n should be changed to a number other than 1 and n+1 is used for detecting when the operation is to stop.

According to the above-mentioned embodiment, a sequence program is recognized by the sequence controller by:

(1) defining a program head code; and
(2) providing means which detects whether the program code that is read while the program is being executed is a program head code or not.

Furthermore, the result from the detecting means is received as an input may be combined with other conditions to stop the sequence controller in order to achieve the desired operations, such as:

(A) stop after every program;
(B) stop after every n programs;
(C) stop after executing a program that includes a particular object that is to be controlled;
(D) stop after executing a program that includes a particular code; and
(E) stop after the execution of the conditions (C) or (D) a plurality of times.

The examples (A) and (B) were already described in connection with the foregoing embodiment. The sequence controller stop means has a content that varies depending upon the above desired operation, and necessitates concrete means as described below:

Means for (A): stop at count 2 of the detecting means.
Means of (B): stop at count n+1 of the detecting means.
Means for (C): Means for storing execution of an access code for a particular object that is to be controlled, and means to stop the operation under the AND condition of a signal therefrom and a signal of the detecting means.
Means for (D): Means for storing execution of particular code, and means to stop the operation under the AND condition of a signal therefrom and a signal of the detecting means.
Means for (E): Means for counting the number of times the AND condition holds true in (C) and (D) and means for comparing this number of times with a number of times of stops that are preset, and means to stop the operation when the compared results are in agreement.

Described below are embodiments for implementing the aforementioned cases (C), (D) and (E).

A second embodiment of the present invention for case (C) has means for stopping the execution of the sequence controller after detecting that a program which includes a program step that designates a particular object that is to be controlled has been executed a predetermined number of times. The construction of major portions of this embodiment, a flow chart of the operation thereof, a sequence program, and a time chart of outputs are shown in FIGS. 8, 9, 10 and 11, respectively. A code decoder 214 includes a comparator circuit 350, an I/O setting register 330 and a latch 360 in addition to a program head detector 216. A sequence program is transmitted from a code register 213 to the code decoder 214 via a bus 300 which is branched into two paths in the code decoder 214, one path 300a thereof being connected to the program head detector 216 and the other path 300b thereof being connected to one input of the comparator circuit 350. The buses 300a and 300b transmit code bits and operand bits of the sequence program, respectively. To the other input of the comparator circuit 350 is supplied an operand that designates a particular object to be controlled, which operand is input through from the peripheral equipment 4 and supplied via processor 3, buses 320, 322 and an I/O setting register 330.

The comparator circuit 350 generates an output when a signal from the code register 213 is in agreement with a signal from the I/O setting register 330, and the output is supplied to a set input terminal of the latch 360. Therefore, the latch 360 is set and an output is generated from the output terminal Q. The program head detector 216 produces an output every time a program head code is detected in the program, and the output is applied to a reset terminal of the latch 360. Therefore, the latch 360 is reset, and the output generated on the output terminal Q is reset, each time another sequence program is started.

Figure 10:
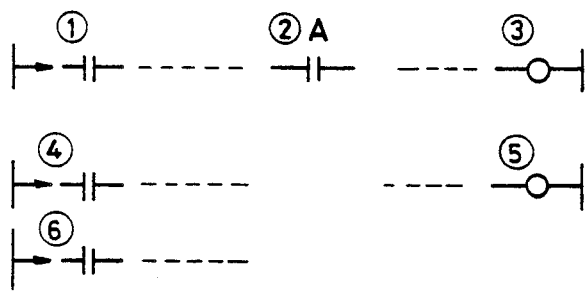
Figure 11:
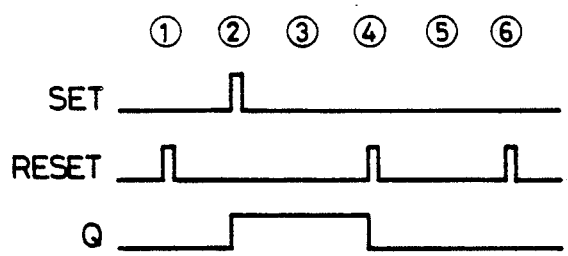

If now there exists a sequence program as shown in FIG. 10, the input and output signals of the latch 360 become as shown in FIG. 11.

Thus, there is obtained means which sets the output Q every time when the I/O number set by the I/O setting register 330 is produced in the circuit, and the execution of the sequence controller is stopped after executing the program that includes a program step which designates a particular object that is to be controlled a given number of time.

A third embodiment of the present invention for case (D) has means for stopping the execution of the sequence controller that will be selectively stopped by a program under a particular condition of a particular object that is to be controlled. The configuration of major portions of this embodiment, a flow chart of the operation, a sequence program and a time chart of outputs are shown in FIGS. 12, 13, 14 and 15, respectively. A code decoder 214 includes a comparator circuit 350, an I/O setting register 330, a latch 360 and a two-input AND gate 370 in addition to the program head detector 216. A sequence program is transmitted from a code register 213 to the code decoder 214 via a bus 300 which is branched into two paths in the code decoder 214, one path 300a thereof being connected to the program head detector 216 and the other path 300b thereof being connected to one input of the comparator circuit 350. The buses 300a and 300b transmit code bits and operand bits in the sequence program, respectively.

The branch 300b has a bus 300c that extends therefrom and leads to the input/output controller 23.

To the other input of the comparator circuit 350 there is input an operand which designates a particular object to be controlled, the operand being input from the peripheral equipment 4 and supplied via processor 3, buses 320, 322 and I/O setting register 330.

The comparator circuit 350 produces an output when a signal from the code register 213 is in agreement with a signal from the I/O setting register 330, and the output is input to a set input terminal of the latch 360 via AND gate 370. To the other input terminal of the AND gate 370 input data (e.g., the on and off condition of a contact, etc.) is supplied from the control input 5 designated by the input/output controller 23. Therefore, the latch 360 is set when an output is produced from the comparator circuit 350 and when an output is produced from a designated control input 5, and an output is produced on the output terminal Q.

The program head detector 216, on the other hand, produces an output every time there is a program head code in the program, and the output is applied to the reset terminal of the latch 360. Therefore, the latch 360 is reset and the output generated on the output terminal Q is reset each time another sequence program is started.

Figure 14:
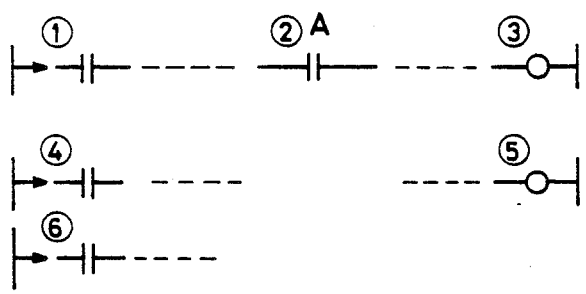
FIGS. 12, 13, 14 and 15 are a block diagram illustrating the structure of major portions of the sequence controller according to a third embodiment of the present invention, a flow chart illustrating the operation thereof, a diagram illustrating a sequential circuit that is to be processed, and a time chart of outputs.
Figure 15:
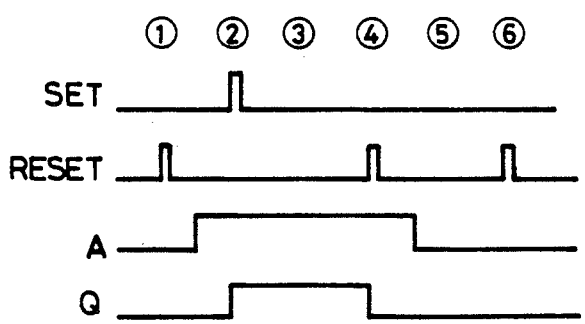
Figure 12:
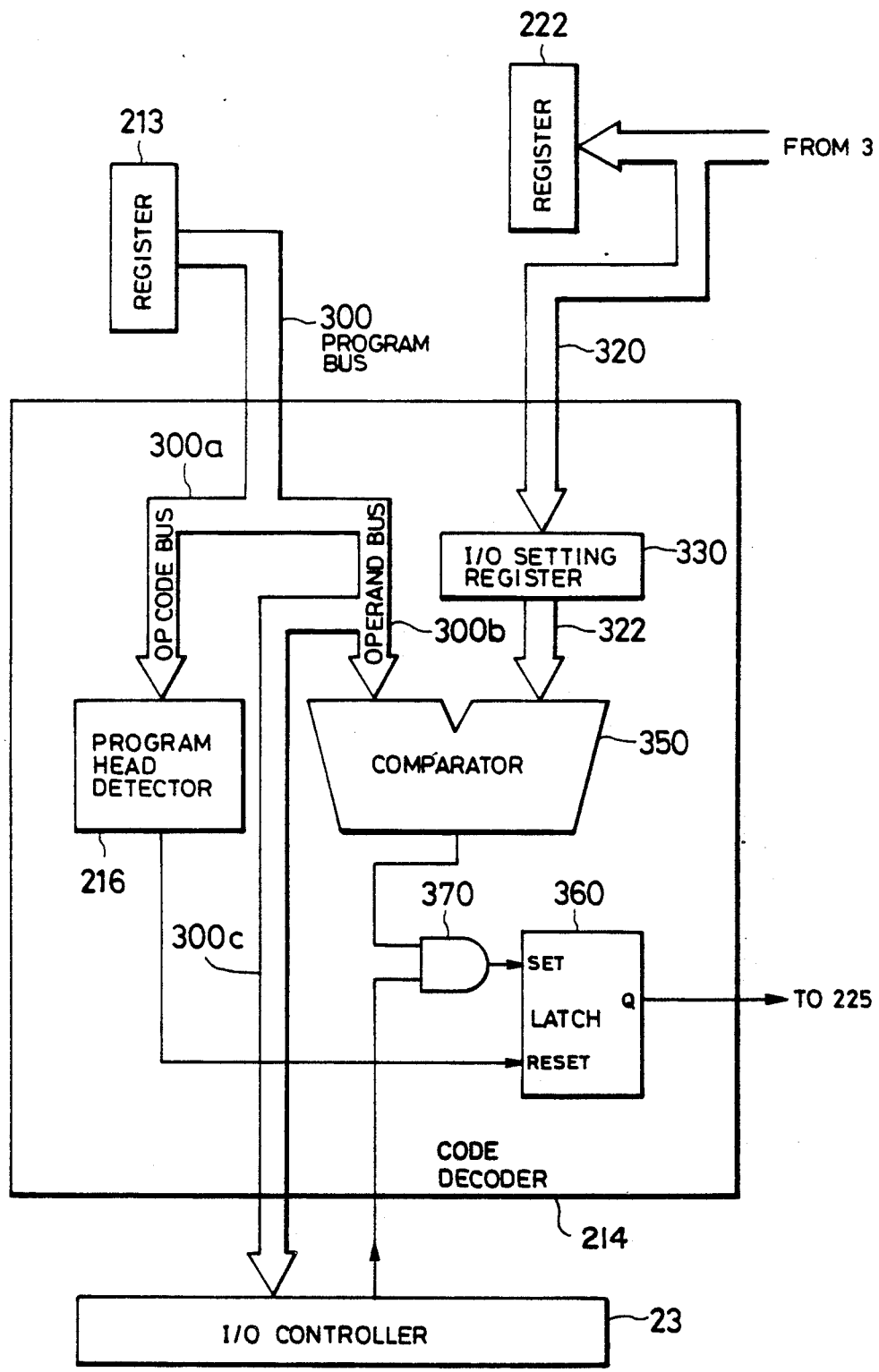
Figure 13:
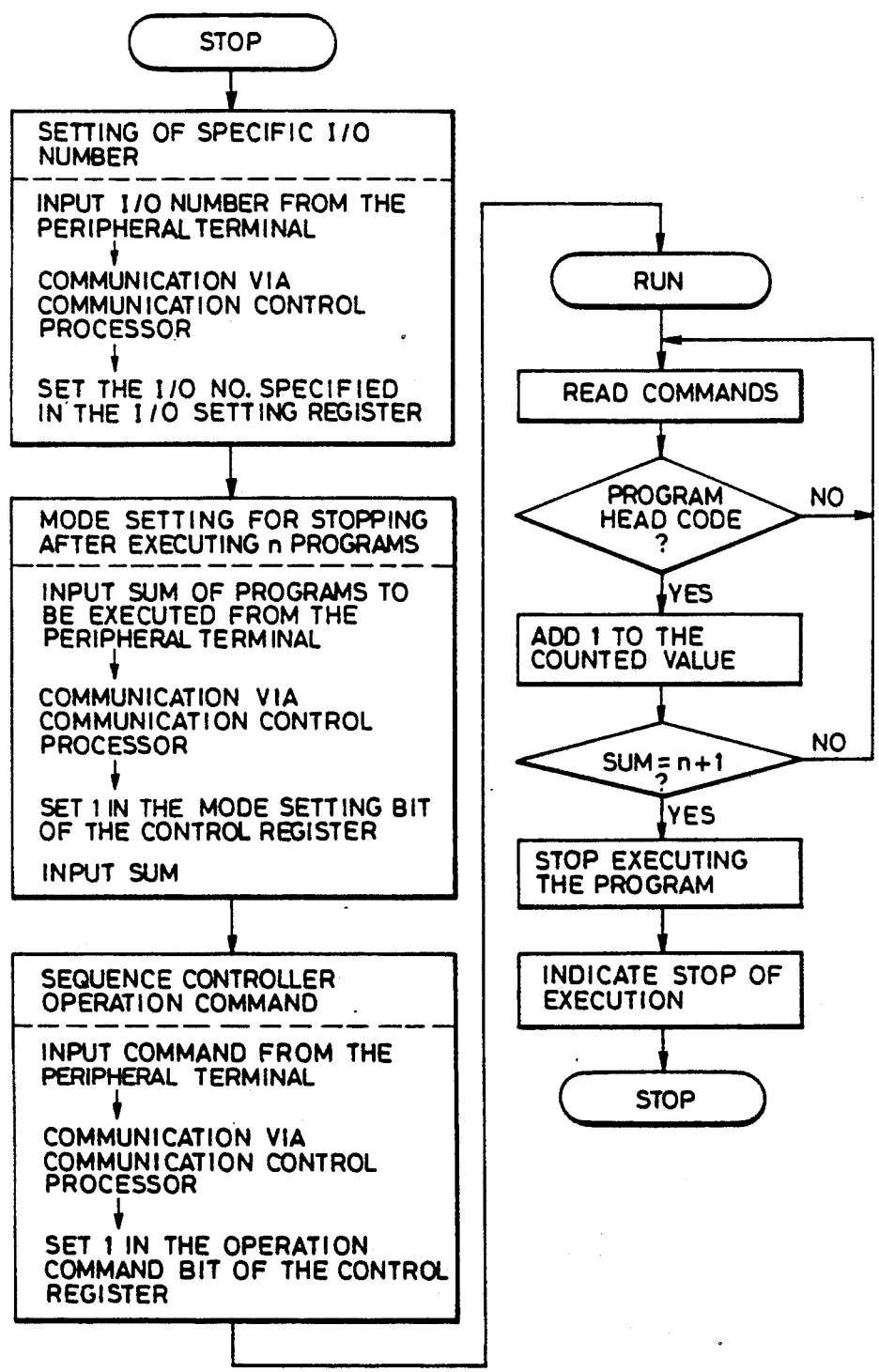
Figure 16:
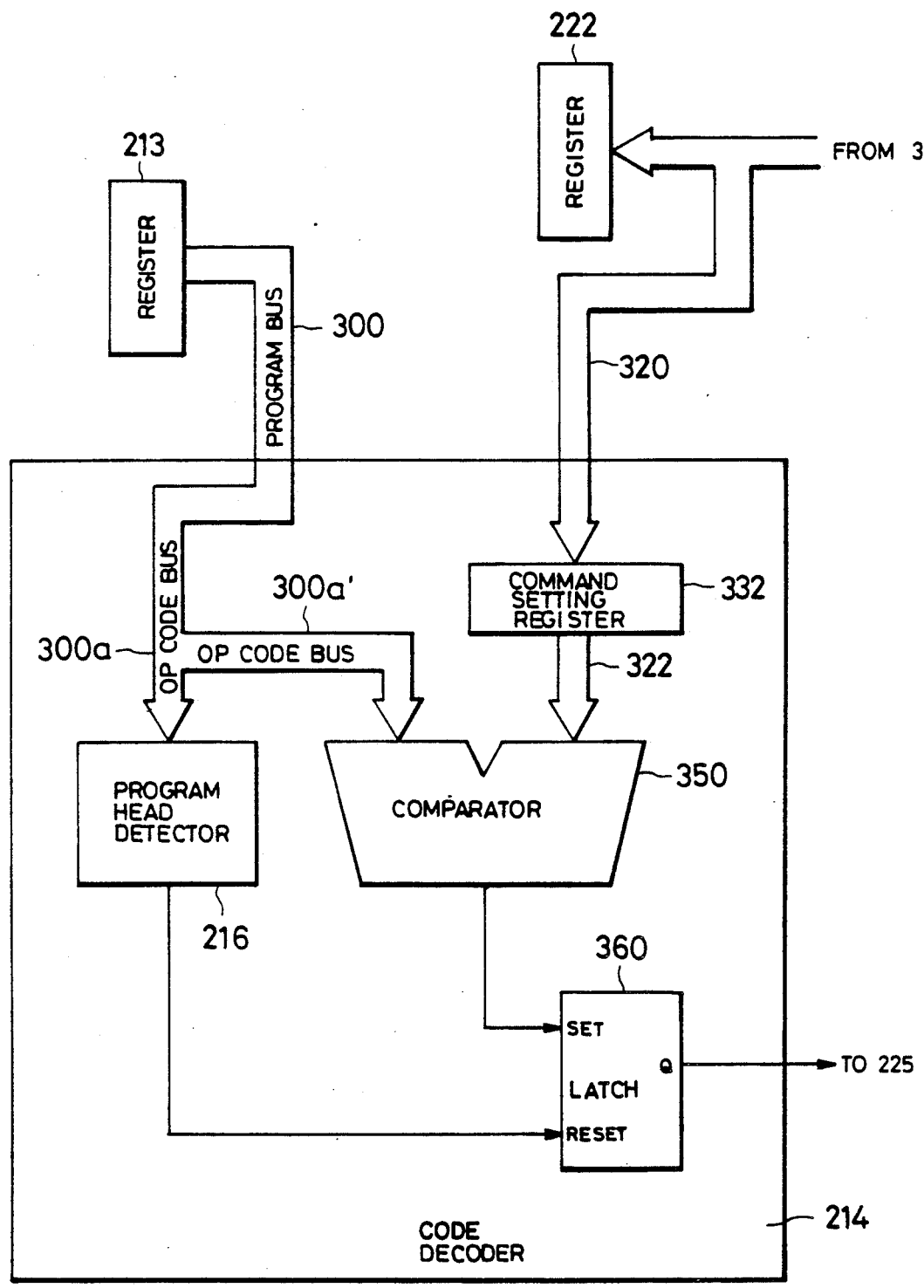
FIGS. 16, 17, 18 and 19 are a block diagram illustrating the structure of major portions of the sequence controller according to a fourth embodiment of the present invention, a flow chart illustrating the operation thereof, a diagram illustrating a sequential circuit that is to be processed, and a time chart of outputs.
Figure 17:
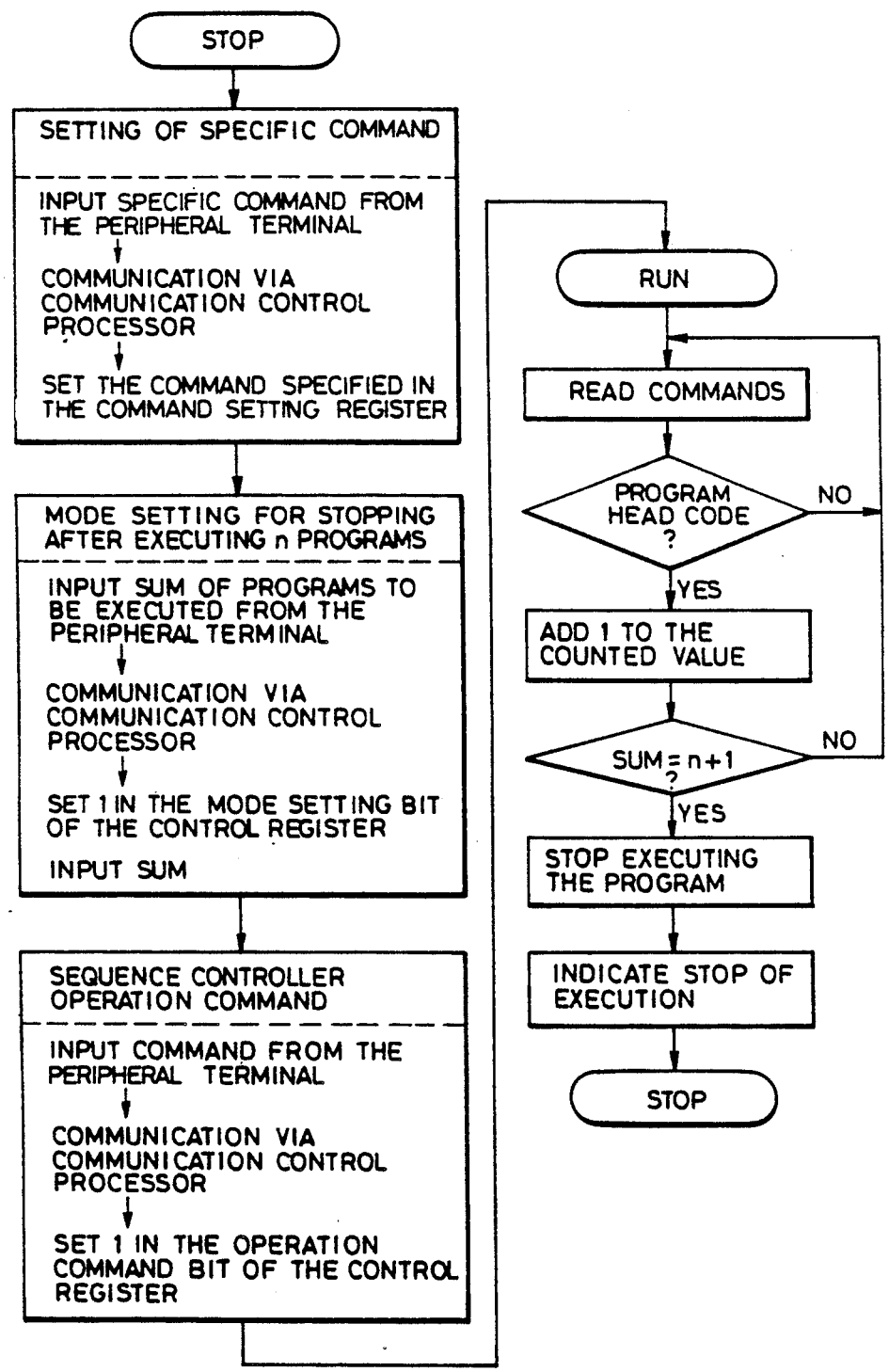

If there exists a sequence program as shown in FIG. 14, the input and output signals of the latch 360 become as shown in FIG. 15.

Thus, there is obtained means which sets the output Q every time the I/O number set by the I/O setting register 330 is produced in the circuit under a particular condition (e.g., the contact is on) of a designated control input, and which stops the execution of the sequence controller that will be selectively stopped under a particular condition of a particular object that is to be controlled.

A fourth embodiment of the present invention for case (E) has means for stopping the execution of the sequence controller after executing a sequence program, that includes a particular sequence program code, a given number of times. The configuration of major portions of the embodiment, a flow chart of the operation, a sequence program and a time chart of outputs are shown in FIGS. 16, 17, 18 and 19, respectively. A code decoder 214 includes a comparator circuit 350, a code setting register 332 and a latch 360 in addition to the program head detector 216. A sequence program is transmitted from the code register 213 to the code decoder 214 via a bus 300 which is branched into two paths in the code decoder 214, one path 300a thereof being connected to the program head detector 216 and the other path 300a' thereof being connected to one input of the comparator circuit 350. The buses 300a and 300a' transmit code bits in the sequence program.

To the other input of the comparator circuit 350 is input a signal for designating a particular instruction (e.g., AND, OR, etc.), which signal is input from the peripheral equipment 4 and supplied via processor 3, buses 320, 322 and code setting register 332.

The comparator circuit 350 produces an output when a signal from the code register 213 is in agreement with a signal from the code setting register 332, and the output is input to a set input terminal of the latch 360. Therefore, the latch 360 is set and an output is produced on the output terminal Q. The program head detector 216, on the other hand, produces an output every time a program head code is found in the program, and the output is input to a reset terminal of the latch 360. Therefore, the latch 360 is reset and the output produced on the output terminal Q is reset.

Figure 18:
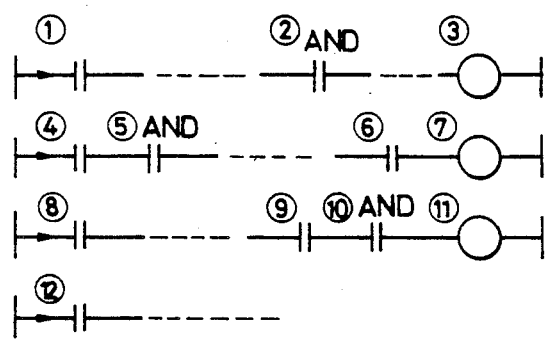
Figure 19:
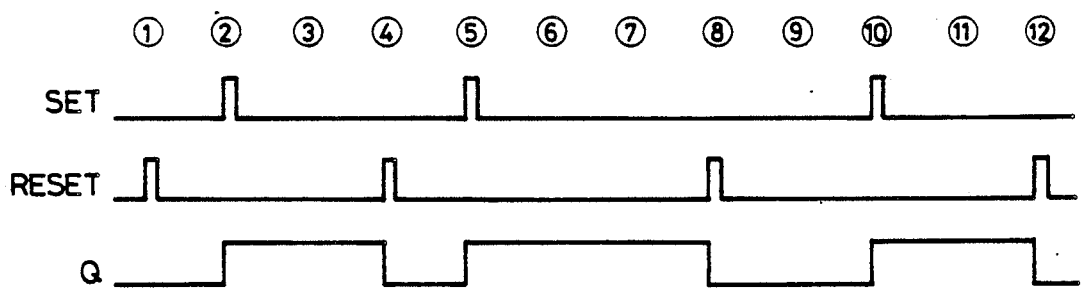

If now there exists a sequence program as shown in FIG. 18, the input and output signals of the latch 360 will become as shown in FIG. 19.

Thus, there is obtained means which sets the output Q every time the code set by the code setting register 332 is produced in the circuit, and which stops the execution of the sequence controller after executing a sequence program, which includes a particular sequence program code, a given number of time.

In the aforementioned embodiments, a head code that indicates a break of the sequence program was provided at the head of each sequence program. According to the present invention, however, the code that indicates a break need not necessarily be provided at the head but may be provided at the tail of the sequence program. To stop the execution after n types of execution, therefore, the execution of the program should be stopped when the number of codes has reached n.

It is further allowable to provide a code that indicates a break of the sequence program at a predetermined position (e.g., second position from the last) in the sequence program to stop the execution after executing the program a predetermined number of times since the code has been detected.

In carrying out the operation for debugging the program using a sequence controller according to the present invention as described above, the user of the sequence controller is allowed to easily know the execution status of every program, making it possible to greatly reduce the time for debugging.

What is claimed is:

1. A sequence controller for effecting a sequence processing depending upon an input condition according to a program which sends a control result to a system to be controlled, said sequence controller comprising:
   memory means for storing a sequence program including plural occurrences of a particular code;
   processor means for executing said sequence program stored in said memory means on the basis of input condition signals received from said system to produce control signals for control of objects in said system to be controlled;
   reading means connected to said memory means for reading said sequence program including said particular code from said memory means and for supplying said sequence program to said processor means;
   counting means connected to said reading means for counting occurrences of said particular code read by said reading means to produce a first value indicating a number of said particular code read by said reading means;
   input means for inputting a second value indicating a number of occurrences of said particular code to be read out from said memory means; and
   comparator means connected to said input means and said counting means for comparing said first value with said second value and for producing a control signal to control said input means and processor means to stop said sequence processing by said processor means when said first value reaches said second value.

2. A sequence controller according to claim 1, wherein said sequence program comprises a plurality of sequence program segments, and said particular code is included in the sequence program to indicate each respective sequence program segment.

3. A sequence controller according to claim 2, wherein said particular code is a program head code located in said sequence program at the head of each sequence program segment.

4. A sequence controller according to claim 1, further including display means responsive to said comparator means generating said control signal for displaying information indicating that sequence processing by said processor means has stopped.

5. A sequence controller according to claim 1, wherein said particular code includes an operation code of an instruction in said sequence program.

6. A sequence controller according to claim 5, wherein said operation code designates one particular operation in said sequence processing.

7. A sequence controller according to claim 5, wherein said counting means includes a comparator having one input connected to receive operation codes from said reading means and a second input connected to receive a command representing a particular operation code, and a counter connected to count an output of said comparator to produce said fist value.

8. A sequence controller according to claim 11, wherein said counting means includes a comparator having one input connected to receive said particular code from said reading means and a second input connected to receive an identification of said particular code to be counted, and a counter connected to count an output of said comparator to produce said first value.

9. A sequence controller according to claim 1, wherein said particular code includes an operand of an instruction in said program, said operand designating an object in said system to be controlled.

10. A sequence controller according to claim 9, wherein said counting means includes a comparator having one input connected to receive said operand from said reading means and a second input connected to receive an identification of said operand to be counted, an AND gate having one input connected to receive an output of said comparator and a second input connected to receive an input from said object in said system to be controlled, and a counter connected to count an output of said AND gate to produce said first value.

11. A sequence controller for effecting a sequence processing depending upon an input condition according to a program which sends a control result to a system to be controlled, said sequence controller comprising:
   memory means for storing a sequence program, including a plurality of sequence program segments, each sequence program segment comprising a plurality of instructions each having an operation code and an operand, one instruction in each sequence program segment having a particular operation code;
   processor means for executing said sequence program stored in said memory means on the basis of input condition signals received from said system to produce control signals for control of objects in said system to be controlled;
   reading means connected to said memory means for reading said sequence program segments from said memory means and for supplying said instructions to said processor means;
   counting means connected to said reading means for counting said particular operation codes read by said reading means to produce a first value indicating a number of sequence program segments supplied to said processor means;
   input means for inputting a second value indicating a number of sequence program segments to be read out from said memory means and executed by said process means; and
   comparator means connected to said input means and said counting means for comparing said first value with said second value and for producing a control signal to control said input means and processor means to stop said sequence processing by said processor means when said first value reaches said second value.

12. A sequence controller according to claim 11, wherein said counting means includes a detector for detecting said particular operation codes read by said reading means and a counter for counting outputs of said detector.

13. A sequence controller according to claim 11, wherein said counting means includes a detector for detecting said particular operation codes, a comparator having a first input connected to receive operands of instructions read by said reading means and a second input connected to receive a signal representing a particular operand, a latch having a set input connected to receive an output of said comparator and a reset input connected to receive an output of said detector, and a counter connected to said latch for counting each time the latch is set to produce said first value.

14. A sequence controller according to claim 13, wherein said particular operand designates an object in said system to be controlled.

15. A sequence controller according to claim 11, wherein said counting means includes a detector for detecting said particular operation codes, a comparator having a first input connected to receive operation codes of instructions read by said reading means and a second input connected to receive a command representing a particular operation code, a latch having a set input connected to receive an output of said comparator and a reset input connected to receive an output of said detector, and a counter connected to said latch for counting each time the latch is set to produce said first value.

16. A sequence controller according to claim 15, wherein said particular operation code designates an operation of an object in said system to be controlled.

17. A sequence controller according to claim 11, wherein said counting means includes a detector for detecting said particular operation codes, a comparator having a first input connected to receive operands of instructions read by said reading means and a second input connected to receive a signal representing a particular operand, an AND gate having one input connected to receive an output of said comparator and a second input connected to receive an input from said objects in said system to be controlled, a latch having a set input connected to receive an output of said AND gate and a reset input connected to receive an output of said detector, and a counter connected to said latch for counting each time the latch is set to produce said first value.

18. A sequence controller according to claim 17, wherein said particular operand designates an object in said system to be controlled.

19. A sequence controller for effecting a sequence processing depending upon an input condition according to a program and sending a control result to a system to be controlled, said sequence controller comprising:
  memory means for storing a plurality of sequence programs, each sequence program representing a sequential circuit and including a particular code;
  input means for inputting a second value indicating a given number of said particular codes to be read out from said memory means;
  processor means for executing said sequence programs stored in said memory means on the basis of input condition signals received from said system to produce control signals for control of objects in said system to be controlled;
  reading means connected to said memory means for reading said sequence programs, each including a particular code, from said memory means and for supplying said sequence programs to said processor means;
  detecting means connected to said reading means for detecting said particular code in each of said sequence programs;
  counting means connected to said detecting means for counting the number of said particular codes detected by said detecting means to produce a first value indicating a number of said particular codes read by said reading means;
  comparator means connected to said input means and said counting means for comparing said first value with said second value and for producing a control signal when said first value reaches said second value; and
  controlling means connected to said comparator means and to said processor means for generating and transmitting to said processor means a stop command in response to said control signal from said comparator means for controlling said processor means to process said sequence program until said stop command is generated.

20. A sequence controller according to claim 19, wherein said controlling means controls said processor means so as to hold a status of said input condition signals and said control signals after said first value reaches said second value.

21. A sequence controller for effecting a sequence processing depending upon an input condition according to a sequence program and for sending a control result to a system to be controlled, said sequence controller comprising:
  memory means for storing a plurality of sequence programs, each representing a respective sequential circuit and including a particular code;
  processor means for executing said sequence programs stored in said memory means on the basis of input condition signals received from said system to produce control signals for control of objects in said system to be controlled;
  input means for inputting a second value indicating a given number of said particular codes to be read out from said memory means;
  reading means connected to said memory means for reading said sequence programs each including said particular code from said memory means and for supplying said sequence programs to said processor means;
  detecting means connected to said reading means for detecting said particular code in each of said sequence programs;
  counting means connected to said detecting means for counting the number of said particular codes detected by said detection means to produce a first value indicating a number of said particular codes read by said reading means;
  comparator means connected to said input means and said counting means for comparing said first value with said second value and for producing a control signal when said first value reaches said second value; and
  controlling means connected to said comparator means and to said processor means for generating and transmitting a stop command in response to said control signal being produced by said comparator means for controlling said processor means so as to stop said sequence processing upon receipt of said stop command.

22. A sequence controller according to claim 21, wherein an output of said controlling means is connected to a timing signal generator of said processor means.

23. A sequence controller according to claim 21, wherein said particular code is a program head code located at the head of each of said sequence programs.

24. A sequence controller according to claim 21, further including display means responsive to said comparator means generating said control signal for displaying information indicating that sequence processing by said processor means has stopped.

25. A sequence controller according to claim 21, wherein said particular code includes an operation code of an instruction in each of said sequence programs.

26. A sequence controller according to claim 25, wherein said operation code designates one particular operation in said sequence processing.

27. A sequence controller according to claim 25, wherein said counting means includes a comparator having one input connected to receive operation codes from said reading means and a second input connected to receive a command representing a particular operation code, and a counter connected to count an output of said comparator to produce said first value.

28. A sequence controller according to claim 21, wherein said counting means includes a comparator having one input connected to receive said particular code from said reading means and a second input connected to receive an identification of said particular code to be counted, and a counter connected to count an output of said comparator to produce said first value.

29. A sequence controller according to claim 21, wherein said particular code includes an operand of an instruction in said sequence programs, said operand designating an object in said system to be controlled.

30. A sequence controller according to claim 29, wherein said counting means includes a comparator having one input connected to receive said operand from said reading means and a second input connected to receive an identification of said operand to be counted, an AND gate having one input connected to receive an output of said comparator and a second input connected to receive an input from said object in said system to be controlled, and a counter connected to count an output of said AND gate to produce said first value.

31. A sequence controller for effecting a sequence processing depending upon an input condition according to a sequence program and for sending a control result to a system to be controlled, said sequence controller comprising:
memory means for storing a plurality of sequence programs, each representing a respective sequential circuit, each sequence program comprising a plurality of instructions each having an operation code and an operand, one instruction in each sequence program having a particular operation code or operand;
processor means for executing said sequence programs stored in said memory means on the basis of input condition signals received from said system to produce control signals for control of objects in said system to be controlled;
input means for inputting a second value indicating a given number of sequence programs to be read out from said memory means and executed by said processor means and for inputting a signal designating either one of a particular operation code or operand in said sequence programs;
reading means connected to said memory means for reading said sequence programs from said memory means and for supplying said instructions to said processor means;
decoder means connected to said reading means and having detecting means connected to said reading means for detecting said particular operation code or operand in each of said programs and a comparator having a first input connected to said reading means and a second input connected to said input means;
counting means connected to said decoder means for counting occurrences of said particular operation code or operand detected by said detecting means to produce a first value indicating a number of sequence programs supplied to said processor means;
comparator means connected to said input means and said counting means for comparing said first value with said second value and for producing a control signal when said first value reaches said second value; and
controlling means connected to said comparator means for controlling said processor means so as to stop said sequence processing upon receipt of said control signal.

32. A sequence controller according to claim 31, wherein in an output of said controlling means is connected to a timing signal generator of said processor means so as to control said sequence processing.

33. A sequence controller according to claim 31, wherein said decoder means includes a comparator having a first input connected to receive operands of instructions read by said reading means and a second input connected to receive a signal representing a particular operand, a latch having a set input connected to receive an output of said comparator and a reset input connected to receive an output of said detector, and said counting means is connected to said latch for counting each time the latch is set to produce said first value.

34. A sequence controller according to claim 33, wherein said particular operand designates an object in said system to be controlled.

35. A sequence controller according to claim 31, wherein said decoder means includes a comparator having a first input connected to receive operation codes of instructions read by said reading means and a second input connected to receive a command representing a particular operation code, a latch having a set input connected to receive an output of said comparator and a reset input connected to receive an output of said detector, and said counting means is connected to said latch for counting each time the latch is set to produce said first value.

36. A sequence controller according to claim 35, wherein said particular operation code designates an operation of an object in said system to be controlled.

37. A sequence controller according to claim 31, wherein said decoder means includes a comparator having a first input connected to receive operands of instructions read by said reading means and a second input connected to receive a signal representing a particular operand, an AND gate having one input connected to receive an output of said comparator and a second input connected to receive an input from said objects in said system to be controlled, a latch having a set input connected to receive an output of said AND gate and a reset input connected to receive an output of said detector, and said counting means is connected to said latch for counting each time the latch is set to produce said first value.

38. A sequence controller according to claim 37, wherein said particular operand designates an object in said system to be controlled.